(12) United States Patent
Holz

(10) Patent No.: US 11,429,194 B2
(45) Date of Patent: *Aug. 30, 2022

(54) CURSOR MODE SWITCHING

(71) Applicant: Ultrahaptics IP Two Limited, Bristol (GB)

(72) Inventor: David S. Holz, San Francisco, CA (US)

(73) Assignee: Ultrahaptics IP Two Limited, Bristol (GB)

(*) Notice: Subject to any disclaimer, the term of this patent is extended or adjusted under 35 U.S.C. 154(b) by 0 days.

This patent is subject to a terminal disclaimer.

(21) Appl. No.: 17/542,990

(22) Filed: Dec. 6, 2021

(65) Prior Publication Data
US 2022/0091680 A1    Mar. 24, 2022

Related U.S. Application Data

(63) Continuation of application No. 17/155,019, filed on Jan. 21, 2021, now Pat. No. 11,194,404, which is a continuation of application No. 16/660,528, filed on Oct. 22, 2019, now Pat. No. 10,901,519, which is a continuation of application No. 16/377,072, filed on Apr. 5, 2019, now Pat. No. 10,459,530, which is a continuation of application No. 15/933,199, filed on
(Continued)

(51) Int. Cl.
| | |
|---|---|
| *G06F 3/01* | (2006.01) |
| *G06F 3/0346* | (2013.01) |
| *B65D 75/58* | (2006.01) |
| *G06F 3/03* | (2006.01) |
| *G06F 3/00* | (2006.01) |
| *G06V 40/20* | (2022.01) |

(52) U.S. Cl.
CPC .......... *G06F 3/017* (2013.01); *B65D 75/5877* (2013.01); *G06F 3/005* (2013.01); *G06F 3/0304* (2013.01); *G06F 3/0346* (2013.01); *G06V 40/20* (2022.01)

(58) Field of Classification Search
CPC ........ G06F 3/017; G06F 3/005; G06F 3/0304; G06F 3/0346; G06V 40/20; B65D 75/5877
See application file for complete search history.

(56) References Cited

U.S. PATENT DOCUMENTS

| | | |
|---|---|---|
| 5,901,170 A | 5/1999 | Peysakhovich et al. |
| 6,266,061 B1 | 7/2001 | Doi et al. |

(Continued)

OTHER PUBLICATIONS

U.S. Appl. No. 17/155,019—Office Action dated Jun. 24, 2021, 16 pages.

(Continued)

*Primary Examiner* — Ricardo Osorio
(74) *Attorney, Agent, or Firm* — Haynes Beffel & Wolfeld LLP; Ernest J. Beffel, Jr.; Paul A. Durdik

(57) ABSTRACT

Methods and systems for processing input from an image-capture device for gesture-recognition. The method further includes computationally interpreting user gestures in accordance with a first mode of operation; analyzing the path of movement of an object to determine an intent of a user to change modes of operation; and, upon determining an intent of the user to change modes of operation, subsequently interpreting user gestures in accordance with the second mode of operation.

20 Claims, 6 Drawing Sheets

Related U.S. Application Data

Mar. 22, 2018, now Pat. No. 10,254,849, which is a continuation of application No. 15/411,909, filed on Jan. 20, 2017, now Pat. No. 9,927,880, which is a continuation of application No. 15/213,899, filed on Jul. 19, 2016, now Pat. No. 9,552,075, which is a continuation of application No. 14/281,817, filed on May 19, 2014, now Pat. No. 9,436,288.

(60) Provisional application No. 61/824,691, filed on May 17, 2013.

(56) References Cited

U.S. PATENT DOCUMENTS

| | | | |
|---|---|---|---|
| 6,901,170 | B1 | 5/2005 | Terada et al. |
| 7,886,236 | B2 | 2/2011 | Kolmykov-Zotov et al. |
| 8,230,852 | B2 | 7/2012 | Zhang et al. |
| 8,235,529 | B1 | 8/2012 | Raffle et al. |
| 8,643,628 | B1 | 2/2014 | Eriksson et al. |
| 8,917,239 | B2 | 12/2014 | Eriksson et al. |
| 8,930,852 | B2 | 1/2015 | Chen et al. |
| 9,056,396 | B1 | 6/2015 | Linnell |
| 9,436,288 | B2 | 9/2016 | Holz |
| 9,459,697 | B2 | 10/2016 | Bedikian et al. |
| 9,552,075 | B2 | 1/2017 | Holz |
| 9,927,880 | B2 | 3/2018 | Holz |
| 10,254,849 | B2 | 4/2019 | Holz |
| 10,459,520 | B2 | 10/2019 | Holz |
| 10,901,519 | B2 | 1/2021 | Holz |
| 11,194,404 | B2 * | 12/2021 | Holz ............... G06F 3/0346 |
| 2003/0081141 | A1 | 5/2003 | Mazzapica |
| 2008/0059915 | A1 | 3/2008 | Boillot |
| 2009/0073117 | A1 | 3/2009 | Tsurumi et al. |
| 2009/0109178 | A1 | 4/2009 | Kim et al. |
| 2009/0217211 | A1 | 8/2009 | Hildreth et al. |
| 2010/0102570 | A1 | 4/2010 | Boyd-Wilson et al. |
| 2010/0177049 | A1 | 7/2010 | Levy et al. |
| 2010/0235786 | A1 | 9/2010 | Maizels et al. |
| 2011/0066984 | A1 | 3/2011 | Li |
| 2011/0119640 | A1 | 5/2011 | Berkes et al. |
| 2011/0251896 | A1 | 10/2011 | Impollonia et al. |
| 2011/0306420 | A1 | 12/2011 | Nishimoto et al. |
| 2011/0316679 | A1 | 12/2011 | Pihlaja |
| 2012/0062558 | A1 | 3/2012 | Lee et al. |
| 2012/0079421 | A1 | 3/2012 | Arriola |
| 2012/0204133 | A1 | 8/2012 | Guendelman et al. |
| 2012/0218183 | A1 | 8/2012 | Givon et al. |
| 2012/0320080 | A1 | 12/2012 | Giese et al. |
| 2013/0191911 | A1 | 7/2013 | Dellinger et al. |
| 2013/0215059 | A1 | 8/2013 | Lim et al. |
| 2013/0222640 | A1 | 8/2013 | Baek et al. |
| 2013/0239059 | A1 | 9/2013 | Chen et al. |
| 2013/0307935 | A1 | 11/2013 | Rappel et al. |
| 2013/0321265 | A1 | 12/2013 | Bychkov et al. |
| 2014/0035946 | A1 | 2/2014 | Chang et al. |
| 2014/0082559 | A1 | 3/2014 | Suggs |
| 2014/0125813 | A1 | 5/2014 | Holz |
| 2014/0132555 | A1 | 5/2014 | Becouarn et al. |
| 2014/0134733 | A1 | 5/2014 | Wu et al. |
| 2014/0157135 | A1 | 6/2014 | Lee et al. |
| 2014/0201666 | A1 | 7/2014 | Bedikian et al. |
| 2014/0223385 | A1 | 8/2014 | Ton et al. |
| 2014/0240215 | A1 | 8/2014 | Tremblay et al. |
| 2014/0331185 | A1 | 11/2014 | Carls et al. |
| 2014/0340311 | A1 | 11/2014 | Holz |
| 2014/0344731 | A1 | 11/2014 | Holz |
| 2014/0344762 | A1 | 11/2014 | Grasset et al. |
| 2014/0375547 | A1 | 12/2014 | Katz et al. |
| 2015/0003673 | A1 | 1/2015 | Fletcher |
| 2015/0084864 | A1 | 3/2015 | Geiss et al. |
| 2015/0153832 | A1 | 6/2015 | Krepec |
| 2015/0220150 | A1 | 8/2015 | Plagemann et al. |
| 2015/0227795 | A1 | 8/2015 | Starner et al. |
| 2016/0328022 | A1 | 11/2016 | Holz |
| 2017/0131784 | A1 | 5/2017 | Holz |

OTHER PUBLICATIONS

U.S. Appl. No. 17/188,915—Notice of Allowance, dated Oct. 29, 2021, 28 pages.
U.S. Appl. No. 17/188,915—Notice of Allowance dated Feb. 15, 2022, 2 pages.
U.S. Appl. No. 14/281,817—Office Action dated Sep. 28, 2015, 5 pages.
U.S. Appl. No. 14/154,730—Office Action dated Nov. 6, 2015, 9 pages.
U.S. Appl. No. 14/262,691—Office Action dated Dec. 11, 2015, 31 pages.
U.S. Appl. No. 14/281,817—Notice of Allowance dated Apr. 22, 2016, 9 pages.
U.S. Appl. No. 15/213,899—Notice of Allowance dated Sep. 14, 2016, 7 pages.
U.S. Appl. No. 14/281,817—Notice of Allowance dated Aug. 2, 2016, 9 pages.
U.S. Appl. No. 14/281,817—Response to Sep. 28 Office Action filed Dec. 28, 2015, 3 pages.
U.S. Appl. No. 15/411,909—Notice of Allowance dated Feb. 27, 2017, 8 pages.
U.S. Appl. No. 15/411,909—Preliminary Amendment filed May 24, 2017, 6 pages.
U.S. Appl. No. 14/281,825—Office Action dated Feb. 11, 2016, 19 pages.
U.S. Appl. No. 14/155,722—Office Action dated Nov. 20, 2015, 14 pages.
U.S. Appl. No. 14/281,825—Office Action dated Aug. 25, 2016, 22 pages.
U.S. Appl. No. 14/281,825—Response to Feb. 11 Office Action filed May 11, 2016, 12 pages.
U.S. Appl. No. 14/281,825—Response to Aug. 25 Office Action filed Nov. 15, 2016, 12 pages.
U.S. Appl. No. 15/411,909—Office Actiion dated Jun. 2, 2017, 16 pages.
U.S. Appl. No. 14/281,925—Office Action dated Jun. 2, 2017, 37 pages.
U.S. Appl. No. 15/411,909—Response to Office Actiion dated Jun. 2, 2017 filed Aug. 31, 2017, 7 pages.
U.S. Appl. No. 15/411,909—Notice of Allowance dated Nov. 22, 2017, 11 pages.
U.S. Appl. No. 14/281,825—Office Action dated Jun. 2, 2017, 37 pages.
U.S. Appl. No. 14/281,825—Response to Office Action dated Jun. 30, 2017 filed , 16 pages.
U.S. Appl. No. 14/281,825—Office Action dated Oct. 13, 2017, 24 pages.
U.S. Appl. No. 15/933,199—Notice of Allowance, dated Oct. 30, 2018, 25 pages.
U.S. Appl. No. 16/377,072—Notice of Allowance dated Jun. 18, 2019, 25 pages.
U.S. Appl. No. 14/281,825—Response to Office Action dated Oct. 13, 2017, filed Mar. 8, 2018, 14 pages.
U.S. Appl. No. 14/281,825—Office Action dated Jun. 27, 2018, 37 pages.
U.S. Appl. No. 14/281,825—Response to Office Action dated Jun. 27, 2018, filed Oct. 29, 2018, 11 pages.
U.S. Appl. No. 14/281,825—Office Action dated Feb. 21, 2019, 33 pages.
U.S. Appl. No. 14/281,825—Response to Office Action dated Feb. 21, 2019, filed Apr. 22, 2019, 14 pages.
U.S. Appl. No. 14/281,825—Office Action dated Jun. 18, 2019, 33 pages.
U.S. Appl. No. 16/660,528—Notice of Allowance dated May 29, 2020, 9 pages.
U.S. Appl. No. 16/660,528—Notice of Allowance dated Sep. 22, 19 pages.
U.S. Appl. No. 15/213,899—Notice of Allowance dated Sep. 14, 2016, 8 pages.
U.S. Appl. No. 15/411,909—Office Action dated Jun. 2, 2017, 16 pages.

(56) References Cited

OTHER PUBLICATIONS

U.S. Appl. No. 15/411,909—Response to Office Action filed Aug. 31, 2017, 7 pages.
U.S. Appl. No. 15/933,199—Corrected Notice of Allowance dated Jan. 17, 2019, 10 pages.
U.S. Appl. No. 14/281,817—Response to Office Action dated Sep. 28, 2015 and filed Dec. 28, 2015, 8 pages.
U.S. Appl. No. 14/281,817—Notice of Allowance dated Apr. 22, 2016, 16 pages.
U.S. Appl. No. 14/281,817—Corrected Notice of Allowability dated Aug. 2, 2016, 9 pages.
U.S. Appl. No. 14/281,825—Proposed Examiner's Amendment filed Nov. 15, 2019, 11 pages.
U.S. Appl. No. 14/281,825—Notice of Allowance dated Nov. 20, 2019, 18 pages.
U.S. Appl. No. 14/281,825—312 Amendment after Notice of Allowance filed Dec. 5, 2019, 10 pages.
U.S. Appl. No. 17/155,019—Notice of Allowance dated Aug. 10, 2021, 8 pages.
U.S. Appl. No. 16/848,696—Notice of Allowance dated Nov. 4, 2020, 22 pages.

* cited by examiner

CURSOR MODE SWITCHING

RELATED APPLICATION

This application is a continuation of U.S. patent application Ser. No. 17/155,019, titled: "CURSOR MODE SWITCHING", filed Jan. 21, 2021, which is a continuation of U.S. patent application Ser. No. 16/660,528, titled: "CURSOR MODE SWITCHING", filed Oct. 22, 2019 issued as U.S. Pat. No. 10,901,519 on Jan. 26, 2021, which is a continuation of U.S. patent application Ser. No. 16/377,072, titled: "CURSOR MODE SWITCHING", filed 5 Apr. 2019 issued as U.S. Pat. No. 10,459,530 on Oct. 29, 2019, which is a continuation of U.S. patent application Ser. No. 15/933,199, titled: "CURSOR MODE SWITCHING", filed 22 Mar. 2018 issued as U.S. Pat. No. 10,254,849 on Apr. 9, 2019, which is a continuation of U.S. patent application Ser. No. 15/411,909, titled: "CURSOR MODE SWITCHING", filed 20 Jan. 2017, issued as U.S. Pat. No. 9,927,880 on Mar. 27, 2018, which is a continuation of U.S. patent application Ser. No. 15/213,899, titled: "CURSOR MODE SWITCHING", filed 19 Jul. 2016, issued as U.S. Pat. No. 9,552,075 on Jan. 24, 2017, which is a continuation of U.S. patent application Ser. No. 14/281,817, titled "CURSOR MODE SWITCHING", filed 19 May 2014 issued as U.S. Pat. No. 9,436,288 on Sep. 6, 2016, which claims the benefit of U.S. Patent Application No. 61/824,691, titled "CURSOR MODE SWITCHING", filed 17 May 2013.

FIELD OF THE TECHNOLOGY DISCLOSED

The present disclosure relates generally to gesture recognition and, in particular, to interpreting gesture-based user input.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to implementations of the claimed technology.

Traditionally, users have interacted with electronic devices, such as a computer or a television, or computing applications, such as computer games, multimedia applications, or office applications, via indirect input devices, including, for example, keyboards, joysticks, or remote controllers. Electronics manufacturers have developed systems that detect a user's movements or gestures and cause the display to respond in a contextually relevant manner. The user's gestures may be detected using an optical imaging system, and characterized and interpreted by suitable computational resources. For example, a user near a TV may perform a sliding hand gesture, which is detected by the gesture-recognition system; in response to the detected gesture, the TV may activate and display a control panel on the screen, allowing the user to make selections thereon using subsequent gestures; for example, the user may move her hand in an "up" or "down" direction, which, again, is detected and interpreted to facilitate channel selection.

A user of a gesture-based system may wish to perform a variety of different tasks and/or issue a variety of different types of commands. A user of a traditional system may enter letters with a keyboard, move a pointer with a mouse, and activate or select a widget with a mouse button; the gesture-based user does not have a similar variety of different input means. Instead, the gesture-based user issues different types of commands with different gestures. A need therefore exists for a gesture-based system that switches between input modes in an intuitive, reliable, and easy-to-use manner.

SUMMARY

In various implementations of the disclosed technology a user of a system controllable with gesture-based input commands intends to switch from a first mode of operation, such as a "move" mode, to a second mode of operation, such as an "action," "draw" or "mouse click" mode. The intent of a user to switch modes may be determined by analyzing the user's gestures. In one implementation, the system analyzes the path of motion of user gestures and determines user intent based thereon. For example, if the user is drawing on a 2D virtual canvas or piece of paper, the system analyzes the user's strokes and determines which strokes are intended to draw on the canvas and which strokes are intended to move to a new section of the canvas without drawing thereon. In one implementation the analysis is based on the curvature of the strokes relative to the canvas. In another implementation, the system employs a hysteresis-like effect to switch between modes. In this implementation, small or slow gestures are interpreted as user intent to stay within the current mode, while the similar gestures performed with a greater range of motion and/or speed are interpreted as user intent to switch modes. A physics-based computer model may be used to model the hysteresis and mode-switching.

In one aspect, a gesture-recognition system includes an image-capture device for obtaining digital images of an object in 3D space, a processor-executable analysis module for computationally determining a path of movement of the object based on the captured images, and a computer memory for storing a digital representation of the path of movement. A processor-executable mode-control module is configured for interpreting user gestures in accordance with a first mode of operation; analyzing the path of movement to determine an intent of a user to change modes of operation; and, upon determining an intent of the user to change modes of operation, subsequently interpreting user gestures in accordance with the second mode of operation.

The system may include a display for displaying the object. The mode-control module may be configured to analyze the path of movement by determining an amount of curvature of the path of movement or a direction of curvature of the path of movement and/or configured to analyze the path of movement by determining whether the path intersects a virtual reference plane. The mode-control module may be configured to create the virtual reference plane based on prior gestures and/or configured to determine if a velocity, acceleration, or range of motion of the movement crosses a threshold to overcome a hysteresis effect associated with the first mode. The hysteresis effect may be based on a physics-based model of the first and second modes. The mode-control module may be configured to analyze a second path of movement to determine the intent of the user to perform a multi-object gesture and change the modes of operation, the mode-control module subsequently interpreting user gestures in accordance with the second mode of operation based on the intent. The mode-control module may be further configured for determining the intent of a user to change modes based on prior gestures.

In another aspect, a method of computationally recognizing and interpreting gestures includes obtaining, using an image-capture device, digital images of a real-world object in 3D space; computationally determining a path of movement of the object based on the captured images; storing, in a computer memory, a digital representation of the path of movement; interpreting user gestures in accordance with a first mode of operation; analyzing the path of movement to determine an intent of a user to change modes of operation; and upon determining an intent of the user to change modes of operation, subsequently interpreting user gestures in accordance with the second mode of operation.

Analyzing the path of movement may include determining an amount of curvature of the path of movement or a direction or orientation of curvature of the path of movement and/or determining whether the path intersects a virtual reference plane. The virtual reference plane may be created based on prior gestures. Analyzing the path of movement may include determining if a velocity, acceleration, or range of motion of the movement crosses a threshold to overcome a hysteresis effect associated with the first mode. The hysteresis effect may be based on a physics-based model of the first and second modes. A second path of movement may be analyzed to determine the intent of the user to perform a multi-object gesture and changing from the first mode to the second mode based on the intent. The intent of a user to change modes may be determined based on prior gestures.

Advantageously, these and other aspects enable machines, computers and/or other types of intelligent devices, and/or other types of automata to obtain information about objects, events, actions, and/or users employing gestures, signals, and/or other motions conveying meaning and/or combinations thereof. These and other advantages and features of the implementations herein described, will become more apparent through reference to the following description, the accompanying drawings, and the claims. Furthermore, it is to be understood that the features of the various implementations described herein are not mutually exclusive and can exist in various combinations and permutations.

BRIEF DESCRIPTION OF THE DRAWINGS

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings, in which.

DETAILED DESCRIPTION

Figure 1:
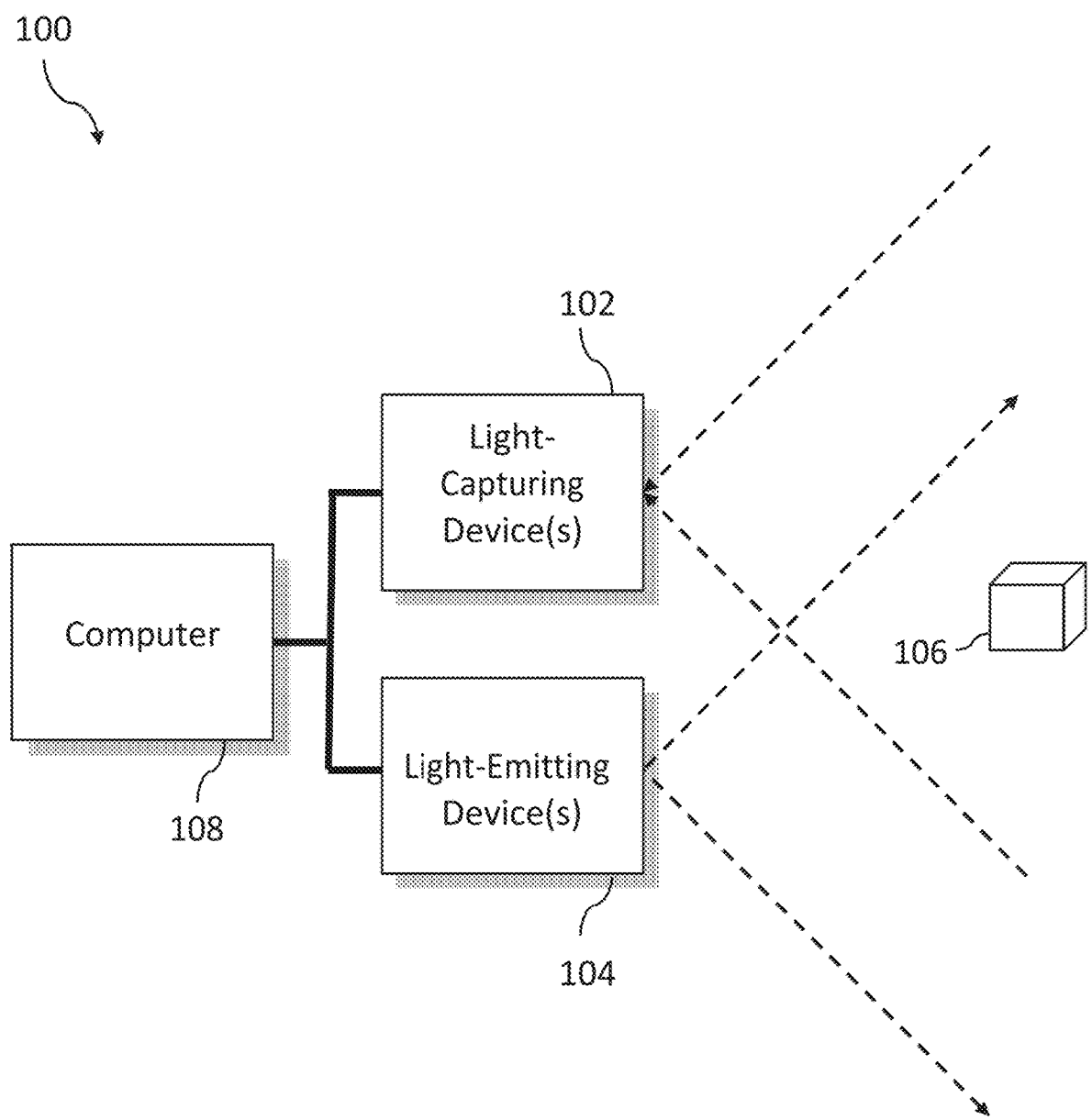
FIG. 1 is a simplified block diagram of an exemplary task environment in accordance with implementations of the technology disclosed.

Motion-capture systems generally include a camera for acquiring images of an object; a computer for processing the images to identify and characterize the object; and a computer display for displaying information related to the identified/characterized object. A light source may also be included to illuminate the object. FIG. 1 illustrates an exemplary motion-capture system 100. The system 100 includes one or more light-capturing devices 102 (e.g., digital cameras or similar devices), each including an image sensor (e.g., a CCD or CMOS sensor), an associated imaging optic (e.g., a lens), and a window of transparent material protecting the lens from the environment. Two or more cameras 102 may be arranged such that their fields of view overlap in a viewed region. One or more light-emitting devices 104 may be used to illuminate an object 106 in the field of view. The cameras 102 provide digital image data to a computer 108, which analyzes the image data to determine the 3D position, orientation, and/or motion of the object 106 the field of view of the cameras 102. As used herein, the term "object" broadly connotes any real-world item. Typically, objects with gestural relevance may include user's finger, hand or other body part, or an item held by a user in performing a gesture, or in some cases, the user herself.

The cameras 102 may include visible-light cameras, infrared (IR) cameras, ultraviolet cameras, or cameras operating in any other electromagnetic frequency regime. Preferably, the cameras 102 are capable of capturing video images. The particular capabilities of cameras 102 may vary as to frame rate, image resolution (e.g., pixels per image), color or intensity resolution (e.g., number of bits of intensity data per pixel), focal length of lenses, and depth of field. In general, for a particular application, any cameras capable of focusing on objects within a spatial volume of interest can be used. For instance, to capture motion of the hand of an otherwise stationary person, the volume of interest might be a cube of one meter sides. To capture motion of a running person, the volume of interest might have dimensions of tens of meters in order to observe several strides.

The cameras may be oriented in any convenient manner. In one implementation, the optical axes of the cameras 102 are parallel, but other orientations of the optical axes are within the scope of the technology disclosed. As described below, each camera 102 may be used to define a "vantage point" from which the object 106 is seen; if the location and view direction associated with each vantage point are known, the locus of points in space that project onto a particular position in the camera's image plane can be determined. In some implementations, motion capture is reliable only for objects in an area where the fields of view of cameras 102 overlaps and the cameras 102 may be arranged to provide overlapping fields of view throughout the area where motion of interest is expected to occur. In other implementations, the system 100 may include one or more light sources 104, and the cameras 102 measure the reflection of the light emitted by the light sources on objects 106. The system may include, for example, two cameras 102 and one light source 104; one camera 102 and two light sources 104; or any other appropriate combination of light sources 104 and cameras 102.

Figure 2:
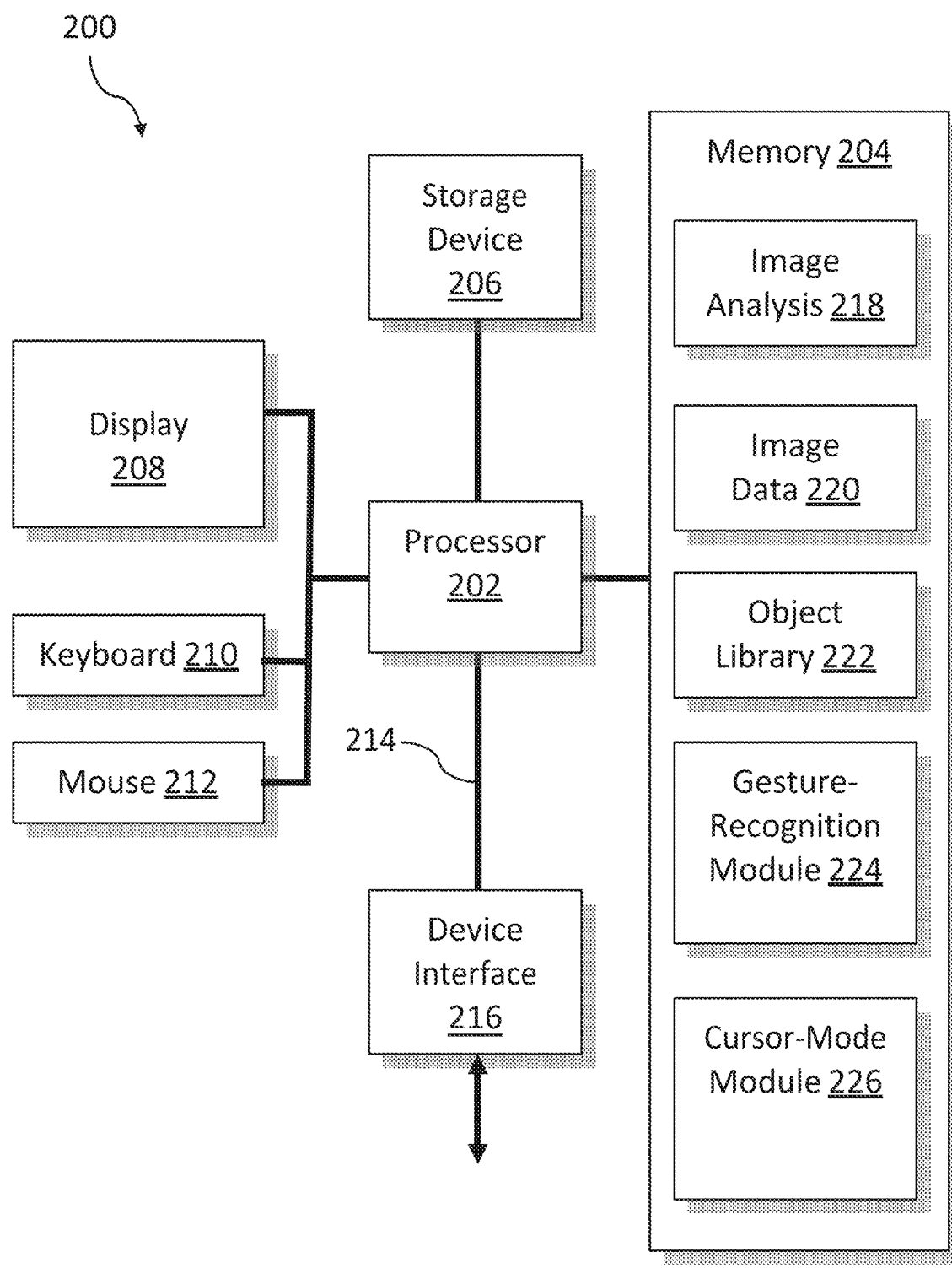
FIG. 2 is a simplified block diagram of an exemplary system for detecting a user gesture and modifying a cursor based thereon in accordance with implementations of the technology disclosed.

Computer 108 may generally be any device or combination of devices capable of processing image data using techniques described herein. FIG. 2 is a simplified block diagram of a suitably programmed general-purpose computer 200 implementing the computer 108 according to an implementation of the technology disclosed. The computer 200 includes a processor 202 with one or more central processing units (CPUs), volatile and/or non-volatile main memory 204 (e.g., RAM, ROM, or flash memory), one or more mass storage devices 206 (e.g., hard disks, or removable media such as CDs, DVDs, USB flash drives, etc. and associated media drivers), a display device 208 (e.g., a liquid crystal display (LCD) monitor), user input devices such as keyboard 210 and mouse 212, and one or more buses 214 (e.g., a single system bus shared between all components, or separate memory and peripheral buses) that facilitate communication between these components.

The cameras 102 and/or light sources 104 may connect to the computer 200 via a universal serial bus (USB), FireWire, or other cable, or wirelessly via Bluetooth, Wi-Fi, etc. The computer 200 may include a camera interface 216, implemented in hardware (e.g., as part of a USB port) and/or software (e.g., executed by processor 202), that enables communication with the cameras 102 and/or light sources 104. The camera interface 216 may include one or more data ports and associated image buffers for receiving the image frames from the cameras 102; hardware and/or software signal processors to modify the image data (e.g., to reduce noise or reformat data) prior to providing it as input to a motion-capture or other image-processing program; and/or control signal ports for transmit signals to the cameras 102, e.g., to activate or deactivate the cameras, to control camera settings (frame rate, image quality, sensitivity, etc.), or the like.

The main memory 204 may be used to store instructions to be executed by the processor 202, conceptually illustrated as a group of modules. These modules generally include an operating system (e.g., a Microsoft WINDOWS, Linux, or APPLE OS X operating system) that directs the execution of low-level, basic system functions (such as memory allocation, file management, and the operation of mass storage devices), as well as higher-level software applications such as, e.g., a motion-capture (mocap) program 218 for analyzing the camera images to track the position of an object of interest and/or a motion-response program for computing a series of output images (or another kind of response) based on the tracked motion. Suitable algorithms for motion-capture program are described further below as well as, in more detail, in U.S. patent application Ser. No. 13/414,485, filed on Mar. 7, 2012 and Ser. No. 13/742,953, filed on Jan. 16, 2013, and U.S. Provisional Patent Application No. 61/724,091, filed on Nov. 8, 2012, which are hereby incorporated herein by reference in their entirety. The various modules may be programmed in any suitable programming language, including, without limitation high-level languages such as C, C++, C #, OpenGL, Ada, Basic, Cobra, Fortran, Java, Lisp, Perl, Python, Ruby, or Object Pascal, or low-level assembly languages.

The memory 204 may further store input and/or output data associated with execution of the instructions (including, e.g., input and output image data 220) as well as additional information used by the various software applications; for example, in some implementations, the memory 204 stores an object library 222 of canonical models of various objects of interest. As described below, a gesture-recognition module 224 may detect an object in the camera images that may be identified by matching its shape to a model in the object library 222, and the model may then inform further image analysis, motion prediction, etc.

In various implementations, the motion captured in a series of camera images is used to compute a corresponding series of output images for display on the computer screen 208. For example, camera images of a moving hand may be translated into a wire-frame or other graphic depiction of the hand by the processor 202. Alternatively, hand gestures may be interpreted as input used to control a separate visual output; by way of illustration, a user may be able to use upward or downward swiping gestures to "scroll" a webpage or other document currently displayed, or open and close her hand to zoom in and out of the page. In any case, the output images are generally stored in the form of pixel data in a frame buffer, which may, but need not be, implemented in main memory 204. A video display controller reads out the frame buffer to generate a data stream and associated control signals to output the images to the display 208. The video display controller may be provided along with the processor 202 and memory 204 on-board the motherboard of the computer 200, and may be integrated with the processor 202 or implemented as a co-processor that manipulates a separate video memory. In some implementations, the computer 200 is equipped with a separate graphics or video card that aids with generating the feed of output images for the display 208. The video card generally includes a graphical processing unit ("GPU") and video memory, and is useful, in particular, for complex and computationally expensive image processing and rendering. The graphics card may implement the frame buffer and the functionality of the video display controller (and the on-board video display controller may be disabled). In general, the image-processing and motion-capture functionality of the system may be distributed between the GPU and the main processor 202 in various conventional ways that are well characterized in the art.

The computer 200 is an illustrative example; variations and modifications are possible. Computers may be implemented in a variety of form factors, including server systems, desktop systems, laptop systems, tablets, smart phones or personal digital assistants, and so on. A particular implementation may include other functionality not described herein, e.g., wired and/or wireless network interfaces, media playing and/or recording capability, etc. In some implementations, one or more cameras may be built into the computer rather than being supplied as separate components. Further, the computer processor may be a general-purpose microprocessor, but depending on implementation can alternatively be, e.g., a microcontroller, peripheral integrated circuit element, a customer-specific integrated circuit ("CSIC"), an application-specific integrated circuit ("ASIC"), a logic circuit, a digital signal processor ("DSP"), a programmable logic device such as a field-programmable gate array ("FPGA"), a programmable logic device ("PLD"), a programmable logic array ("PLA"), smart chip, or other device or arrangement of devices.

Further, while computer 200 is described herein with reference to particular blocks, this is not intended to limit the technology disclosed to a particular physical arrangement of distinct component parts. For example, in some implementations, the cameras 102 are connected to or integrated with a special-purpose processing unit that, in turn, communicates with a general-purpose computer, e.g., via direct memory access ("DMA"). The processing unit may include one or more image buffers for storing the image data read out from the camera sensors, a GPU or other processor and associated memory implementing at least part of the motion-capture algorithm, and a DMA controller. The processing unit may provide processed images or other data derived from the camera images to the computer for further processing. In some implementations, the processing unit sends display control signals generated based on the captured motion (e.g., of a user's hand) to the computer, and the computer uses these control signals to adjust the on-screen display of documents and images that are otherwise unrelated to the camera images (e.g., text documents or maps) by, for example, shifting or rotating the images.

In one implementation, a cursor-mode module 226 maintains different modes for an on-screen cursor, or other interactive on-screen object, that is controlled by user gestures; the cursor-mode module 226 switches between the modes by analyzing the gestures to determine the intent of a user to switch modes. Typical scenarios in which a user may intend to switch between modes include first moving an on-screen cursor and then clicking with that cursor and first drawing a stroke of a letter, number, or any other symbol or object and then moving the cursor to another location without drawing. The disclosed technology is not limited, however, to any particular type of modes, and the implementations described herein may be applied to any mode in any application, game, or other computer program or program interface.

Figure 3A:
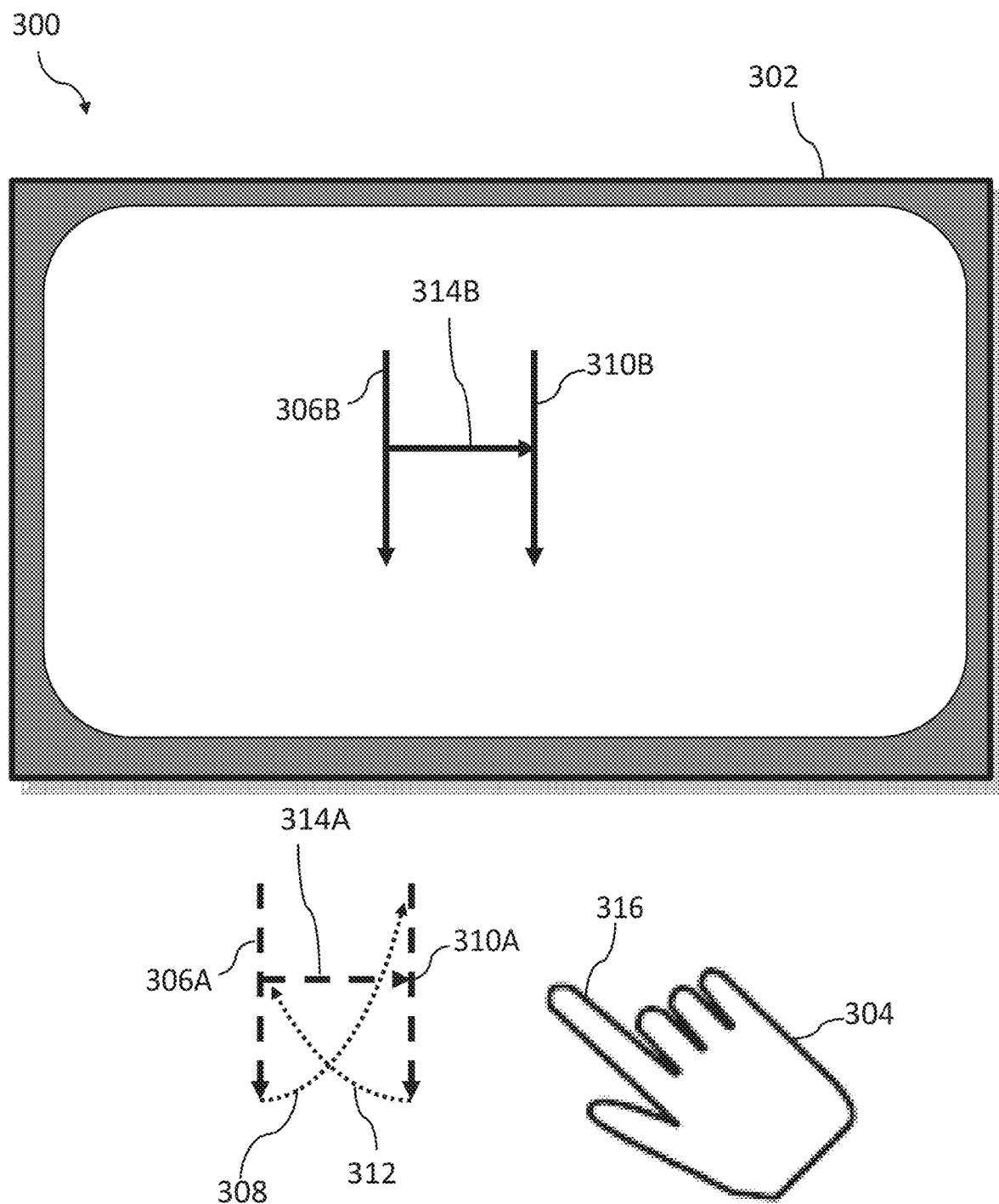
FIGS. 3A, 3B and 3C illustrate an implementation of mode-switching based on gesture paths in accordance with implementations of the technology disclosed.

The on-screen drawing of the capital letter H using gestures is herein presented as an example using an implementation of the technology disclosed. One of skill in the art will understand, however, that the techniques and systems described are not limited to only this or other letters and may be applied to a variety of applications and uses, such as drawing, painting, scrolling, pressing virtual buttons, manipulating virtual scrollbars or sliders, or providing input to games or other applications. FIG. 3A illustrates a system 300 including a computer display 302 and a user's hand 304. The display may be the display 208 illustrated in FIG. 2; some or all of the remainder of the system of FIG. 2 may also be included in the system 300 of FIG. 3, but is not pictured for clarity. The processor 202 is executing, in this implementation, a drawing or text-entry program for interpreting gestures made by the hand 304 as strokes of characters. The hand 304 performs a series of gestures, including a first drawing gesture 306A (which the system 300 interprets, using the gesture-recognition module 224 and the systems and methods described above and the cursor-mode module 226 described below) as a first downstroke 306B of an on-screen H. The user next makes a first movement gesture 308 to set up a second drawing gesture 310A; the system does not draw anything on the screen 302 corresponding to the first movement gesture 308 but does draw a second on-screen downstroke 310B for the second drawing gesture 310A. The user makes a second movement gesture 312 to set up a third drawing gesture 314A to draw the on-screen cross-stroke 314B.

Figure 3B:
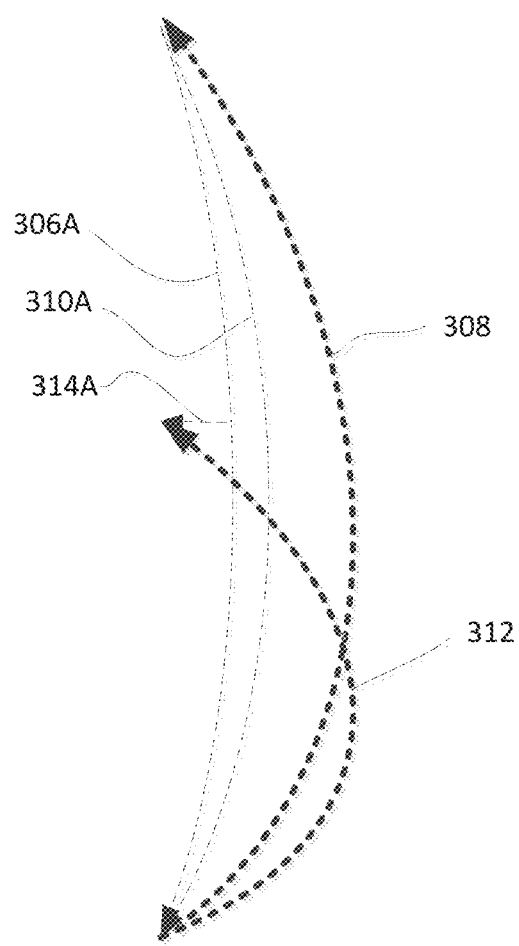
Figure 3C:
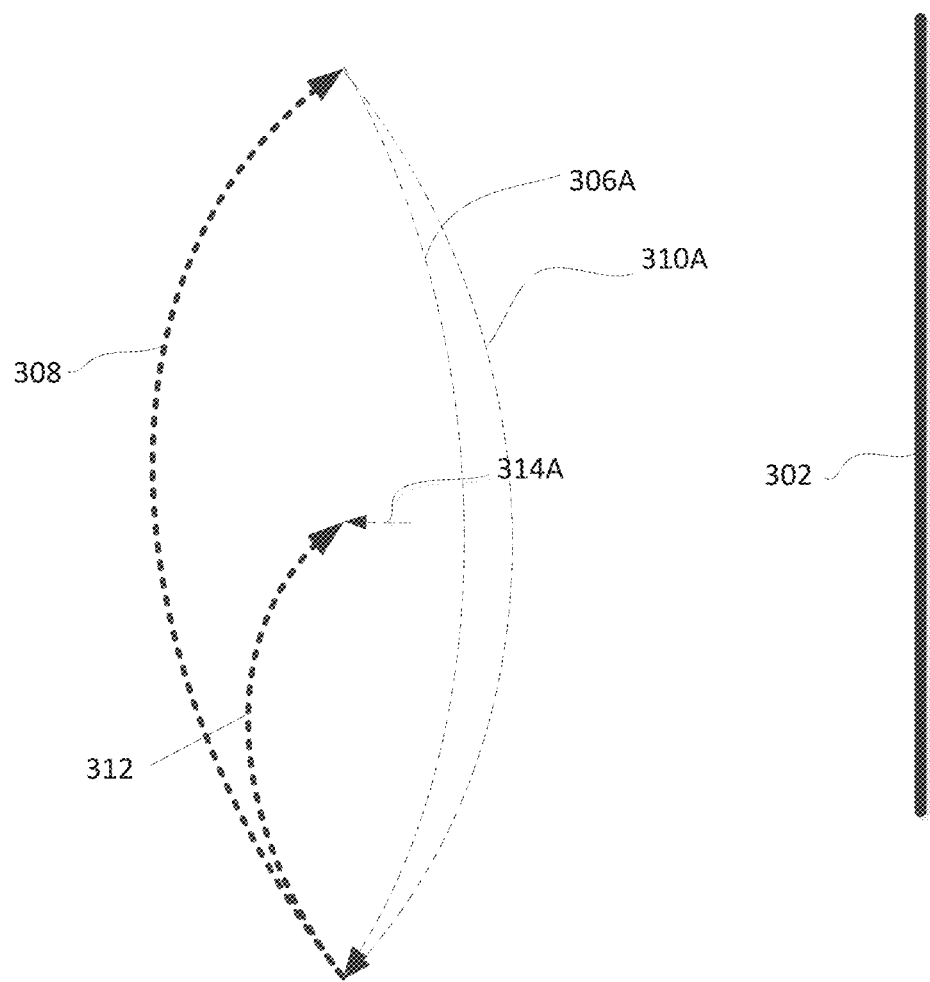

At each transition between a drawing gesture 306A, 310A, 314A and a movement gesture 308, 312, the cursor-mode module 226 detects a user intent to switch between drawing and movement modes. In one implementation, the cursor-mode module 226 analyzes the amount and orientation of curvature present in the path that the hand 304 makes while performing the gestures. For example, FIG. 3B illustrates the user gestures in this implementation from a perspective horizontally perpendicular to the perspective shown FIG. 3A. In this example, the cursor-mode module 226 may detect that the drawing gestures 306A, 310A, 314A have little curvature or are straight or nearly straight and the movement gestures 308, 312 are curved. In this example, the movement of the hand 304 or a point on the hand 304, such as the tip of its index finger 316, follows a straighter path through 3D space when making the drawing gestures 306A, 310A, 314A and a more curved path through 3D space when making the movement gestures 308, 312. In another implementation, the orientation of curvature is used to determine the intended mode. FIG. 3C illustrates the user gestures in this implementation from a perspective horizontally perpendicular to the perspective shown FIG. 3A. The path drawn through 3D space by the hand 304 may be curved in a first direction when making the drawing gestures 306A, 310A, 314A (e.g., the midpoint of the curved path is closer to the screen 302 than the endpoints of the curved path) and curved in a second direction when making the movement gestures 308, 312 (e.g., the midpoints of these curved paths are farther away from the screen 302 than the endpoints). In another implementation the amount of curvature is use to determine the intended mode. For example, a threshold of curvature may be used to separate a drawing gesture from a movement gesture. The amount of curvature may be determined by the maximum distance between the path of the curve and an ideal straight line between the endpoints of the gesture. An amount of curvature above a threshold of curvature may indicate intent to be in the first mode and below intent to be in the second mode. The threshold between a first mode and second mode may be a fixed distance (e.g., one to five centimeters). In another implementation, the cursor-mode module 226 models the path of the gesture as a mathematical curve (e.g., a parabola or elliptical curve) and determines the mode of the gesture based on parameters of the modeled curve (e.g., the axes of the ellipse or coefficients of the parabola).

In one implementation, the mode of a gesture is determined when the gesture is completed. In other implementations, the amount and nature of curvature of the paths of the gestures 306A, 308, 310A, 312, 314A may be determined as the hand 304 begins to trace the paths (i.e., before the gesture is fully completed). For example, the cursor-mode module 226 may decide the mode of operation of the gestures 306A, 308, 310A, 312, 314A after the hand 304 has moved a given distance (e.g., five or ten centimeters) or has completed a certain percentage of a predicted total path distance (e.g., five or ten percent). In another implementation, the cursor-mode module 226 decides the mode of operation of the gestures 306A, 308, 310A, 312, 314A after a given amount of curvature or straightness has been detected (e.g., once a path has deviated by one or two centimeters or five or ten degrees away from a virtual reference plane or line).

The virtual reference plane, or other reference use for determining an amount of curvature, may be a vertical plane, or other fixed predetermined plane, and/or may be determined by previous gestures. For example, the plane defined by the first drawing gesture 306A may be used to determine whether the first movement gesture 308 is straight or curved. Additional drawing gestures made by the hand may be used to further define the virtual reference plane; in one implementation, an average of all, or a fixed running average of some, drawing gestures are used to define the reference plane. In another implementation, gestures made in which the index finger 316 occupies the same space as the virtual reference plane are deemed to be drawing gestures and gestures made in which the index finger 316 is separated by some distance (e.g., one to five centimeters) from the virtual reference plane at some point during the gesture (e.g., the midpoint) are deemed to be movement gestures.

In one implementation, the cursor-mode module 226 uses the direction in which an object is pointed to determine the mode of operation of the gestures. For example, the direction the index finger 316 is pointing may be used to determine the mode of operation of the gestures 306A, 308, 310A, 312, 314A. If the index finger 316 is pointing in a first direction, for example toward a point located above a horizontal plane, when it begins a gesture, the cursor-mode module 226 determines the mode of operation is a drawing mode. In this same example, if the index finger 316 is pointing in a second direction, for example toward a point located below the horizontal plane, when it begins a gesture, the cursor-mode module 226 may determine the mode of operation is a movement mode. In another implementation, the cursor-mode module 226 switches to drawing mode for downward (or mostly downward) gestures and to movement mode for upward (or mostly upward) gestures.

When determining mode the cursor-mode module 226 is not limited to using a single factor and may consider any combination of the disclosed factors including; amount of path curvature, curvature direction/orientation, distance from reference plane, pointing direction, and gesture direction. In implementations using multiple factors to determine mode, factors may be weighted to more heavily influence the mode determination. Further, when determining mode the cursor-mode module 226 is not limited determining between two modes and may use any combination to the factors to determine the mode of operation from more than two modes of operation.

As described above, the gesture-recognition module 224 and/or the cursor-mode module 226 may not determine a mode for a gesture until after the object making the gesture has traveled a certain distance in 3D space. In implementations, certain applications, such as the drawing application discussed above with reference to FIG. 3, may display a discontinuity or jolt to a user as this traveled distance is suddenly filled in by the application once the mode is determined to be a drawing mode. In an implementation, instead of filling in the discontinuity all at once, the drawing application re-traces the already traveled path of the object, drawing in the path at a higher velocity than that traveled by the object. For example, if the object is moving at 10 cm/s and it has already moved 5 cm before the cursor-mode module 226 determined that the movement is a drawing gesture, the 0-5 cm distance is filled in from 0 to 5 cm at a rate of 20 cm/s until the filled-in line "catches up" to the object, at which point the drawing rate drops to the object-movement rate. In one implementation, the gesture-recognition module 224 and/or the cursor-mode module 226 pass position data relating to the object to the drawing application (or any other application) to facilitate this drawing method; for example, no position data is passed until the cursor-mode module 226 determines the mode of the gesture, after which the faster-rate motion is passed until the drawing catches up to the current position of the object, after which normal-rate position information is passed.

In other implementations, the gesture-recognition module 224 and/or the cursor-mode module 226 "guess" a mode of operation before the actual mode of operation is determined. The guess may be to always first assume a drawing mode or a movement mode. In either or both cases, any lines or other markings displayed on the screen 302 during the guessing period may be displayed in a color or shade different from the other lines or markings (e.g., grey instead of black). If the actual mode of operation is drawing the displayed different color becomes the intended color and if the actual mode of operation is movement the displayed different color disappears. In other implementations, the guess may be made based on prior gestures. For example, if the last gesture was a drawing gesture the current gesture may be guessed as movement, and vice versa.

The cursor-mode module 226 may switch modes of a cursor based on multiple tracked objects. For example, a user may make a gesture using two or more fingers (e.g., a "pinching" gesture using a thumb and index finger or a gesture using an index finger on each hand) or using a stylus held in one hand and a finger on the other hand. In these implementations, the cursor-mode module 226 may switch to a mode associated with the particular multi-object gesture even if, for example, only one object intersects the virtual plane discussed above.

In some implementations of the technology disclosed, the cursor-mode module 226 implements a physics-based computer model to switch between modes. The model may implement a hysteresis-like effect between the modes. In these implementations, small or slow gestures are interpreted as user intent to stay within the current mode and gestures with similarly shaped paths performed with a range of motion and/or velocity greater than a threshold are interpreted as user intent to switch modes. In one implementation, the two modes are a cursor-movement mode and a clicking/interaction mode. In each mode, the gesture-recognition module 224 is more sensitive to gestures corresponding to that mode and less sensitive to gestures that do not correspond to that mode. For example, while in the clicking mode, the gesture-recognition module 224 may register button-pressing motions as clicks even if the button-pressing motions are made using only a user's finger, are made slowly, or are made by the user's finger traveling only a short distance. In order to enter the clicking mode, however, the cursor-mode module 226 may require button-pressing motions made with a user's entire hand (or with more than one finger), faster motions, and/or motions made over a greater distance. Motions that the cursor-mode module 226 registers as clicks while in the clicking mode may not be sufficient to enter the clicking mode.

Figure 4:
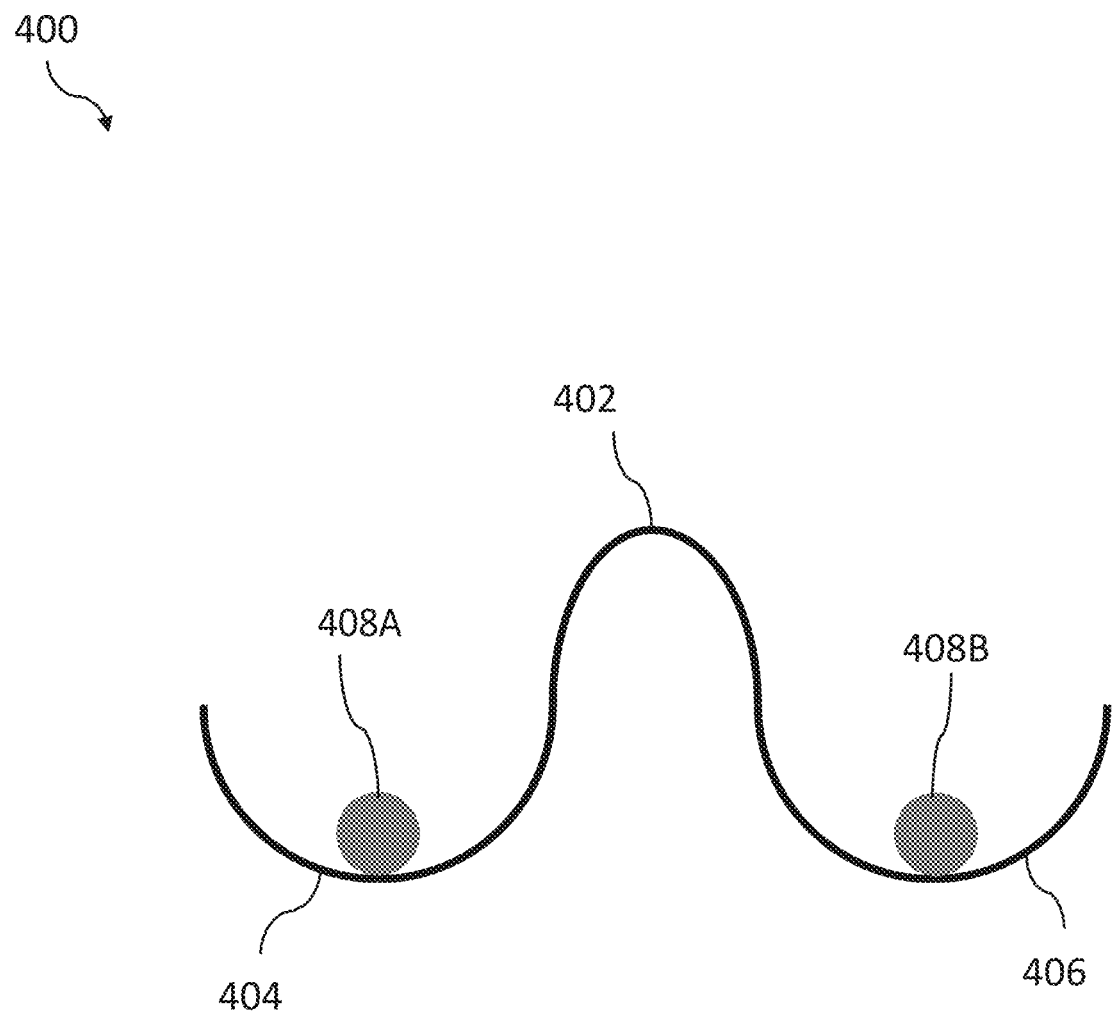
FIG. 4 illustrates an implementation of mode-switching based on a physical model in accordance with implementations of the technology disclosed.

FIG. 4 illustrates a physics-based computer model 400 that the cursor-mode module 226 may implement to switch modes. The model includes a virtual "hill" 402 having a first "valley" 404 on one side and a second "valley" 406 on its other side. A virtual "ball" 408A, 408B exists in either the first 404 or second 406 valley. One valley may be associated with a first mode of operation (e.g., movement) while the other valley may be associated with a second mode of operation (e.g., clicking). The intensity, distance, velocity, and/or acceleration of a user gesture "pushes" the ball 408A, 408B up the hill 402. Less-intense gestures do not push the ball 408A, 408B with enough force to surmount the hill 404 and enter the other valley 404, 406; only a more intense gesture may do so, and thereby switch modes. For example, if the ball 408A is in the first valley 404, the cursor-mode module 226 selects a movement mode; in order to switch to a clicking mode associated with the second valley 406, the user must make a clicking motion of greater velocity, acceleration, or distance to enter the clicking mode than would otherwise be required, while in the clicking mode, to create a click.

Implementations may be employed in a variety of application areas, such as for example and without limitation consumer applications including interfaces for computer systems, laptops, tablets, television, game consoles, set top boxes, telephone devices and/or interfaces to other devices; medical applications including controlling devices for performing robotic surgery, medical imaging systems and applications such as CT, ultrasound, x-ray, MRI or the like, laboratory test and diagnostics systems and/or nuclear medicine devices and systems; prosthetics applications including interfaces to devices providing assistance to persons under handicap, disability, recovering from surgery, and/or other infirmity; defense applications including interfaces to aircraft operational controls, navigations systems control, on-board entertainment systems control and/or environmental systems control; automotive applications including interfaces to automobile operational systems control, navigation systems control, on-board entertainment systems control and/or environmental systems control; security applications including, monitoring secure areas for suspicious activity or unauthorized personnel; manufacturing and/or process applications including interfaces to assembly robots, automated test apparatus, work conveyance devices such as conveyors, and/or other factory floor systems and devices, genetic sequencing machines, semiconductor fabrication related machinery, chemical process machinery and/or the like; and/or combinations thereof.

Implementations of the technology disclosed may further be mounted on automobiles or other mobile platforms to provide information to systems therein as to the outside environment (e.g., the positions of other automobiles). Further implementations of the technology disclosed may be used to track the motion of objects in a field of view or used in conjunction with other mobile-tracking systems. Object tracking may be employed, for example, to recognize gestures or to allow the user to interact with a computationally rendered environment; see, e.g., U.S. Patent Application Ser. No. 61/752,725 (filed on Jan. 15, 2013) and Ser. No. 13/742,953 (filed on Jan. 16, 2013), the entire disclosures of which are hereby incorporated by reference.

It should also be noted that implementations of the technology disclosed may be provided as one or more computer-readable programs embodied on or in one or more articles of manufacture. The article of manufacture may be any suitable hardware apparatus, such as, for example, a floppy disk, a hard disk, a CD ROM, a CD-RW, a CD-R, a DVD ROM, a DVD-RW, a DVD-R, a flash memory card, a PROM, a RAM, a ROM, or a magnetic tape. In general, the computer-readable programs may be implemented in any programming language. Some examples of languages that may be used include C, C++, or JAVA. The software programs may be further translated into machine language or virtual machine instructions and stored in a program file in that form. The program file may then be stored on or in one or more of the articles of manufacture.

Certain implementations of the technology disclosed were described above. It is, however, expressly noted that the technology disclosed is not limited to those implementations, but rather the intention is that additions and modifications to what was expressly described herein are also included within the scope of the technology disclosed. For example, it may be appreciated that the techniques, devices and systems described herein with reference to examples employing light waves are equally applicable to methods and systems employing other types of radiant energy waves, such as acoustical energy or the like. Moreover, it is to be understood that the features of the various implementations described herein were not mutually exclusive and can exist in various combinations and permutations, even if such combinations or permutations were not made express herein, without departing from the spirit and scope of the technology disclosed. In fact, variations, modifications, and other implementations of what was described herein will occur to those of ordinary skill in the art without departing from the spirit and the scope of the technology disclosed. As such, the disclosed technology is not to be defined only by the preceding illustrative description.

What is claimed is:

1. A system for gesture-recognition, comprising:
    a computer memory for storing a digital representation of a determined path of movement of an object of interest in a three-dimensional (3D) space; and
    a processor coupled to the computer memory; and
    a processor-executable mode-control module configured to:
        obtain an intent of a user to be in a first mode of operation comprising a drawing mode in which a line is displayed following movement of the object of interest; and
        fill in a displayed line at a rate that is faster than a detected rate of the object of interest until the displayed line catches up with the object of interest, and thereafter displaying movement of the object of interest at the detected rate of the object of interest.

2. The system of claim 1, wherein the processor-executable mode-control module is further configured to:
    obtain an intent of the user to change from another mode of operation to the first mode of operation comprising the drawing mode based at least in part upon a determined pointing direction of the object of interest; and
    perform the filling in of the displayed line when in the drawing mode.

3. The system of claim 1, wherein the filling in of the displayed line includes passing position data relating to the object of interest to a drawing application.

4. The system of claim 1, wherein no position data is passed until a mode is determined, after which faster-rate motion is passed until the displayed line catches up to a current position of the object of interest.

5. The system of claim 4, further including passing normal-rate position information after the displayed line catches up to the current position of the object of interest.

6. The system of claim 1, wherein a discontinuity or jolt is displayed as distance traveled by the object of interest is filled in once a mode of operation is determined to be the drawing mode.

7. The system of claim 1, further including re-tracing a path already traveled by the object of interest by drawing in the path at a higher velocity than that traveled by the object of interest.

8. The system of claim 1, wherein a mode of operation for a gesture is not determined until after the object of interest making the gesture has traveled some distance in 3D space.

9. The system of claim 1, wherein no line is displayed for movement along a path when a mode of operation is a movement mode.

10. A method of computationally interpreting gestures, the method comprising:
    obtaining an intent of a user to be in a first mode of operation comprising a drawing mode in which a line is displayed following movement of an object of interest, wherein intent is determined at least in part from a path of movement of the object of interest in a three-dimensional (3D) space; and
    filling in a displayed line at a rate that is faster than a detected rate of the object of interest until the displayed line catches up with the object of interest, and thereafter displaying movement of the object of interest at the detected rate of the object of interest.

11. The method of claim 10, further comprising:
    obtaining an intent of the user to change from another mode of operation to the first mode of operation comprising the drawing mode based at least in part upon a determined pointing direction of the object of interest; and
    performing the filling in of the displayed line when in the drawing mode.

12. The method of claim 10, wherein the filling in of the displayed line includes passing position data relating to the object of interest to a drawing application.

13. The method of claim 10, wherein no position data is passed until a mode is determined, after which faster-rate motion is passed until the displayed line catches up to a current position of the object of interest.

14. The method of claim 13, further including passing normal-rate position information after the displayed line catches up to the current position of the object of interest.

15. The method of claim 10, further including displaying a discontinuity or jolt as distance traveled by the object of interest is filled in once a mode of operation is determined to be the drawing mode.

16. The method of claim 10, further including re-tracing a path already traveled by the object of interest by drawing in the path at a higher velocity than that traveled by the object of interest.

17. The method of claim 10, wherein a mode of operation for a gesture is not determined until after the object of interest making the gesture has traveled some distance in 3D space.

18. The method of claim 10, wherein no line is displayed for movement along a path when a mode of operation is a movement mode.

19. A non-transitory computer readable storage medium impressed with computer program instructions to computationally interpret gestures, which instructions, when executed on a processor, implement:

obtaining an intent of a user to be in a first mode of operation comprising a drawing mode in which a line is displayed following movement of an object of interest, wherein intent is determined at least in part from a path of movement of the object of interest in a three-dimensional (3D) space; and filling in a displayed line at a rate that is faster than a detected rate of the object of interest until the displayed line catches up with the object of interest, and thereafter displaying movement of the object of interest at the detected rate of the object of interest.

20. The non-transitory computer readable storage medium of claim 19, wherein the instructions, when executed on the processor, further implement:

obtaining an intent of the user is change from another mode of operation to the first mode of operation comprising the drawing mode based at least in part upon a determined pointing direction of the object of interest; and performing the filling in of the displayed line when in the drawing mode.

* * * * *

UNITED STATES PATENT AND TRADEMARK OFFICE
CERTIFICATE OF CORRECTION

PATENT NO. : 11,429,194 B2
APPLICATION NO. : 17/542990
DATED : August 30, 2022
INVENTOR(S) : David S. Holz It is certified that error appears in the above-identified patent and that said Letters Patent is hereby corrected as shown below:

In the Claims

In Claim 4, Column 12, Line 21, change "The system of claim 1" to "The system of claim 3".

Signed and Sealed this
First Day of November, 2022

Katherine Kelly Vidal
*Director of the United States Patent and Trademark Office*